Figure 1:
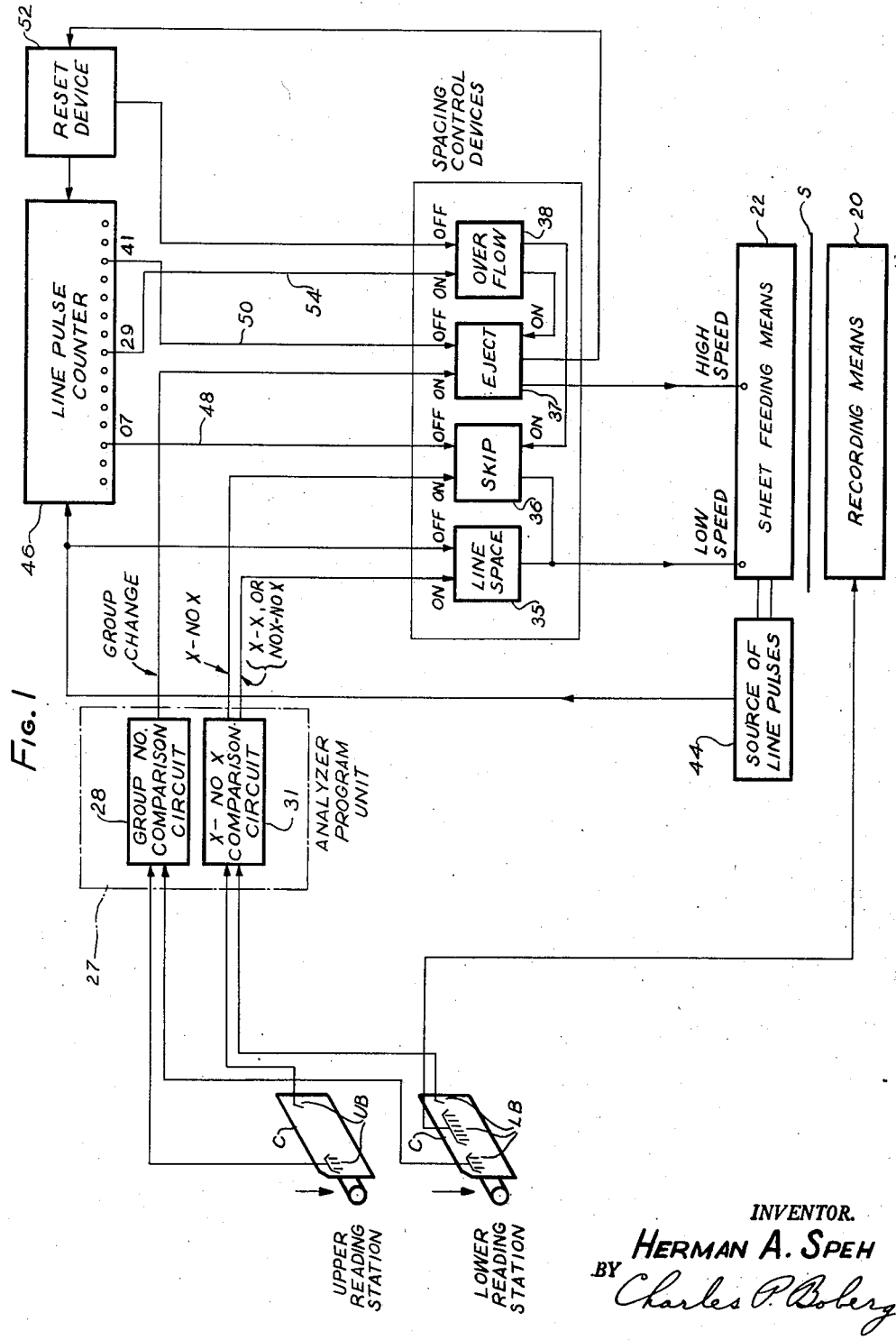

April 22, 1958 H. A. SPEH 2,831,561
SELECTIVE CONTROL FOR SHEET FEEDING APPARATUS
Filed April 28, 1954 13 Sheets-Sheet 1

INVENTOR.
HERMAN A. SPEH
BY Charles P. Boberg
ATTORNEY

April 22, 1958   H. A. SPEH   2,831,561
SELECTIVE CONTROL FOR SHEET FEEDING APPARATUS
Filed April 28, 1954   13 Sheets-Sheet 2

INVENTOR.
Herman A. Speh
BY Charles P. Boberg
ATTORNEY

April 22, 1958

H. A. SPEH 2,831,561

SELECTIVE CONTROL FOR SHEET FEEDING APPARATUS

Filed April 28, 1954

13 Sheets-Sheet 3

Fig. 4

INVENTOR.
HERMAN A. SPEH
BY
Charles P. Boberg
ATTORNEY

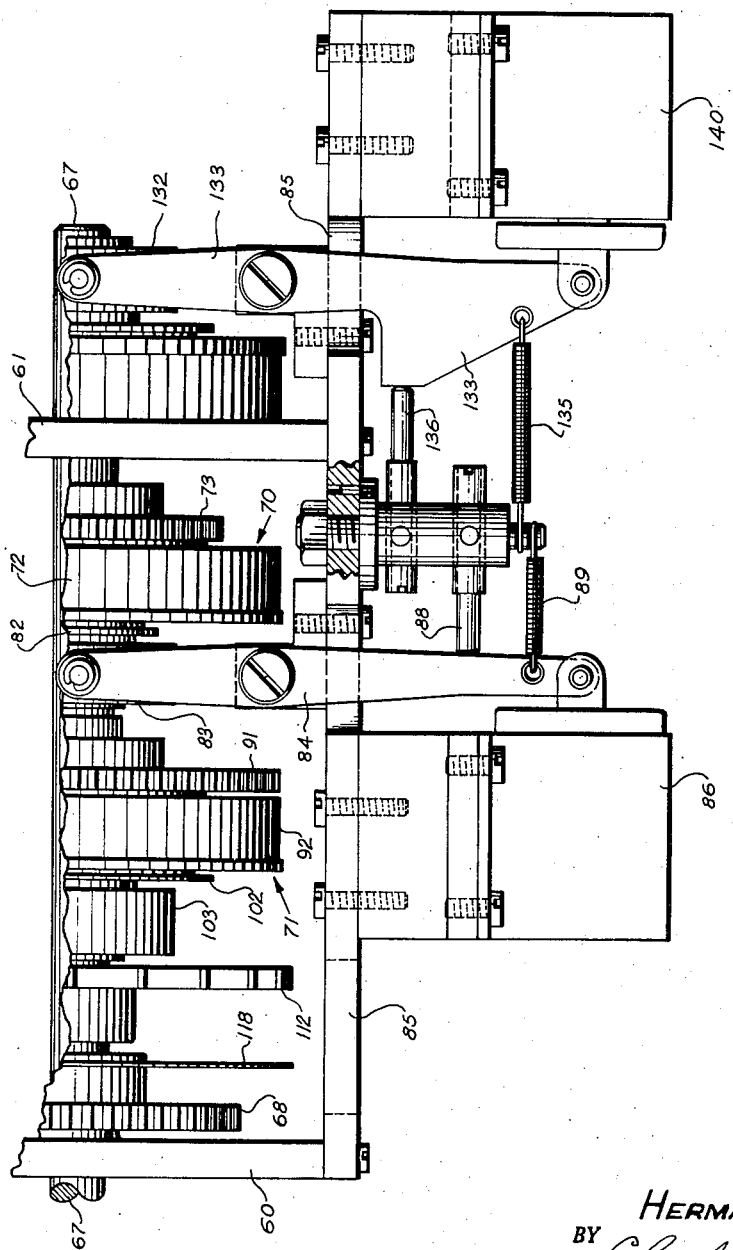

April 22, 1958 H. A. SPEH 2,831,561
SELECTIVE CONTROL FOR SHEET FEEDING APPARATUS
Filed April 28, 1954 13 Sheets-Sheet 7
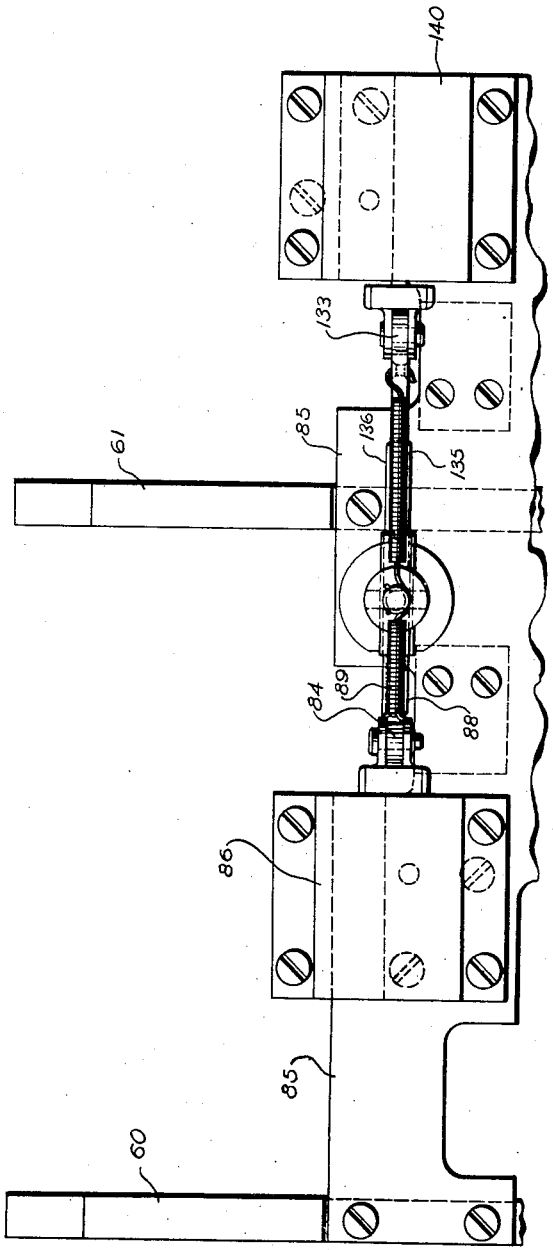
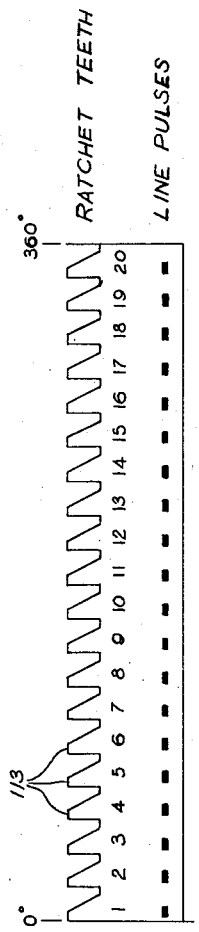
INVENTOR.
HERMAN A. SPEH
BY Charles P. Boberg
ATTORNEY April 22, 1958

H. A. SPEH 2,831,561

SELECTIVE CONTROL FOR SHEET FEEDING APPARATUS

Filed April 28, 1954

13 Sheets-Sheet 8

INVENTOR.
HERMAN A. SPEH
BY
Charles P. Boberg
ATTORNEY

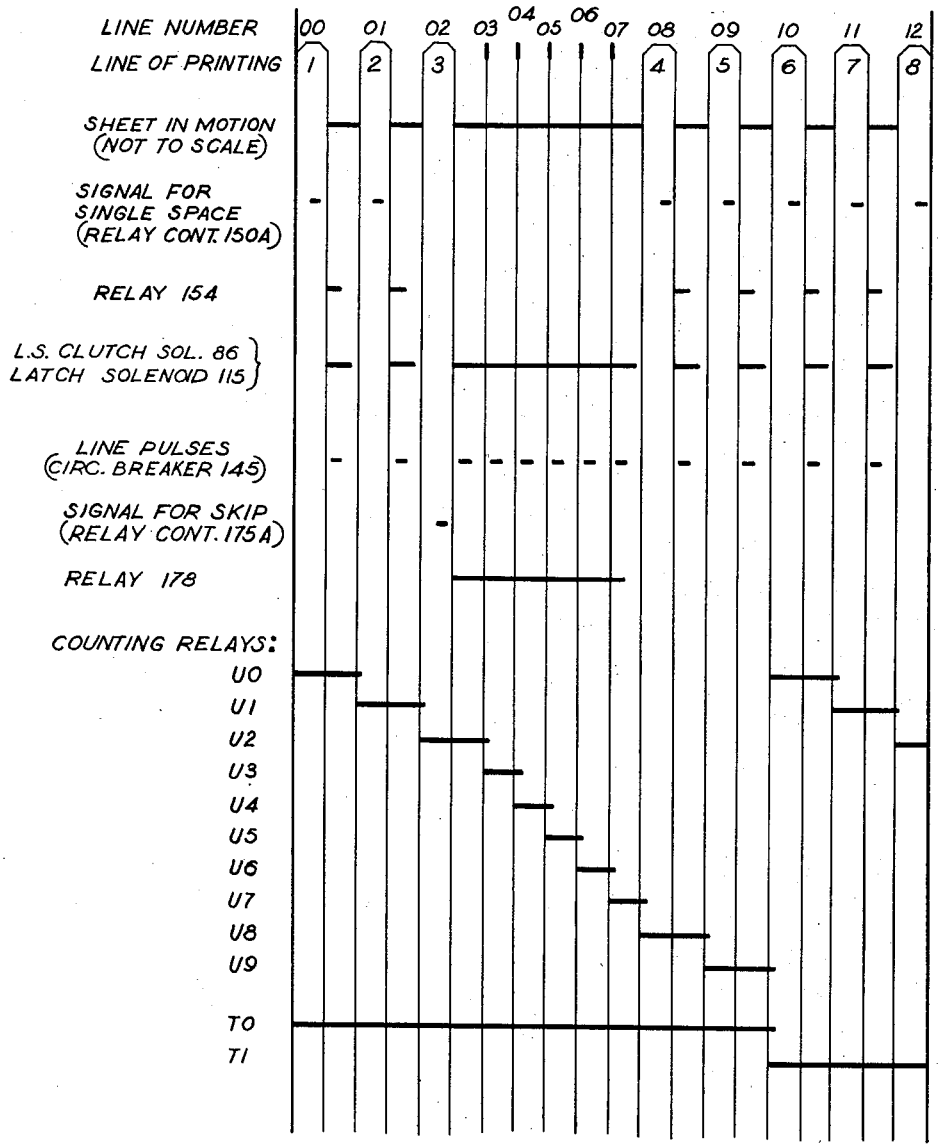

April 22, 1958          H. A. SPEH          2,831,561
SELECTIVE CONTROL FOR SHEET FEEDING APPARATUS
Filed April 28, 1954          13 Sheets-Sheet 13
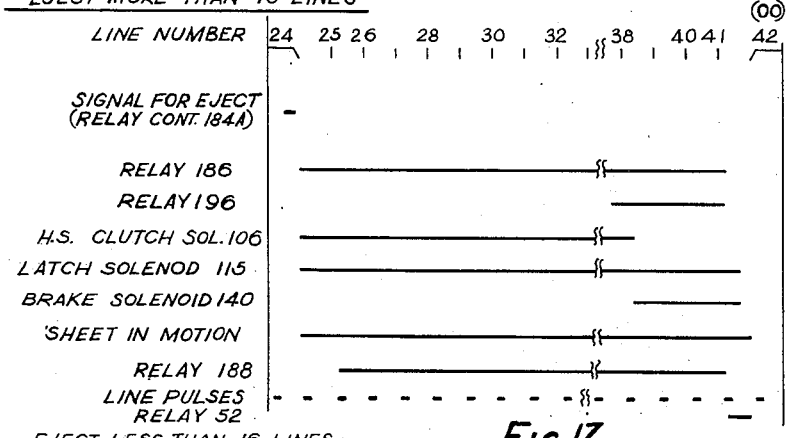
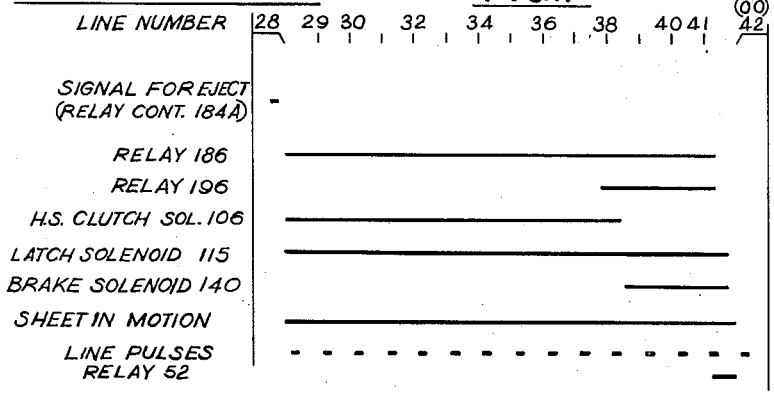
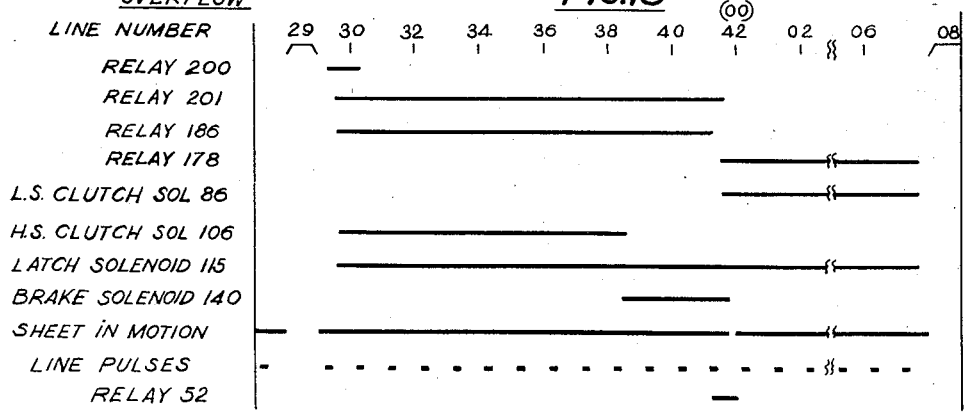
INVENTOR.
HERMAN A. SPEH
BY
Charles P. Boberg
ATTORNEY United States Patent Office 2,831,561
Patented Apr. 22, 1958

2,831,561
SELECTIVE CONTROL FOR SHEET FEEDING APPARATUS

Herman A. Speh, East Williston, N. Y., assignor to Burroughs Corporation, Detroit, Mich., a corporation of Michigan Application April 28, 1954, Serial No. 426,167

9 Claims. (Cl. 197—133)

This invention relates to sheet feeding devices for recording machines, and particularly to apparatus for selectively controlling the distance through which a sheet is moved between recording operations or the line position to which a sheet is moved in a given sheet feeding operation.

In the copending application of Albert Teitler, Serial No. 405,490, filed January 21, 1954, now U. S. Patent No. 2,790,528, there is disclosed a sheet feeding control apparatus in which various spacing control devices are selectively operated in accordance with the amounts of sheet feeding movement required. The respective control devices may be held in their operative states for different periods through the combined actions of associated holding devices and individual terminating devices therefor, each of the latter being adapted to release its holding device (and consequently the respective spacing control device) after a fixed or measured time interval, depending upon the rate at which the sheet is being fed and the length of feed desired.

An object of the present invention is to provide an improved sheet feeding control apparatus of the general type disclosed in the aforesaid Teitler application but in which each sheet feeding movement can be selectively terminated without resorting to a multiplicity of timing devices having fixed delay periods.

Another object is to provide a novel, highly flexible control means for selectively terminating the movement of an impression-receiving sheet through a recording machine, and more particularly to provide a selectively pluggable means for controlling a variety of sheet feeding movements.

A further object is to provide a novel line counting device which is settable (by selective plugging, for example) so as to terminate each type of feeding movement after the sheet has been fed to a preselected line position which is dependent upon the setting of said line counting device.

A still further object is to provide an improved line counter utilizing a novel relay circuit for the purposes just stated.

Other and further objects of the invention will be pointed out in the following description and claims and illustrated in the accompanying drawings, which disclose, by way of examples, the principle of the invention and the best mode, which has been contemplated, of applying that principle.

Figure 2:
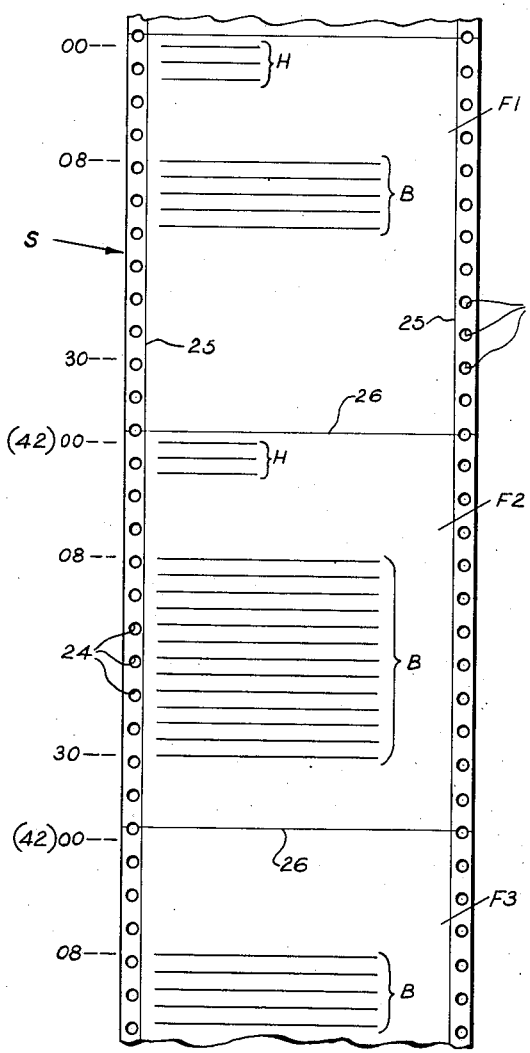
Figure 3:
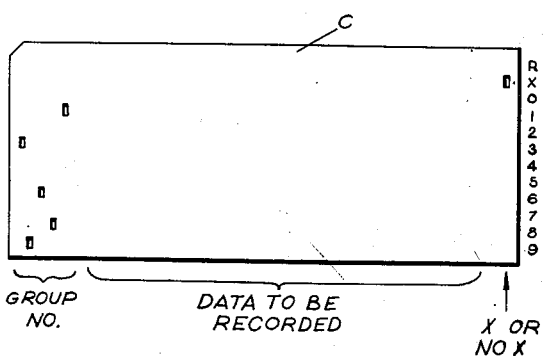
Figure 5:
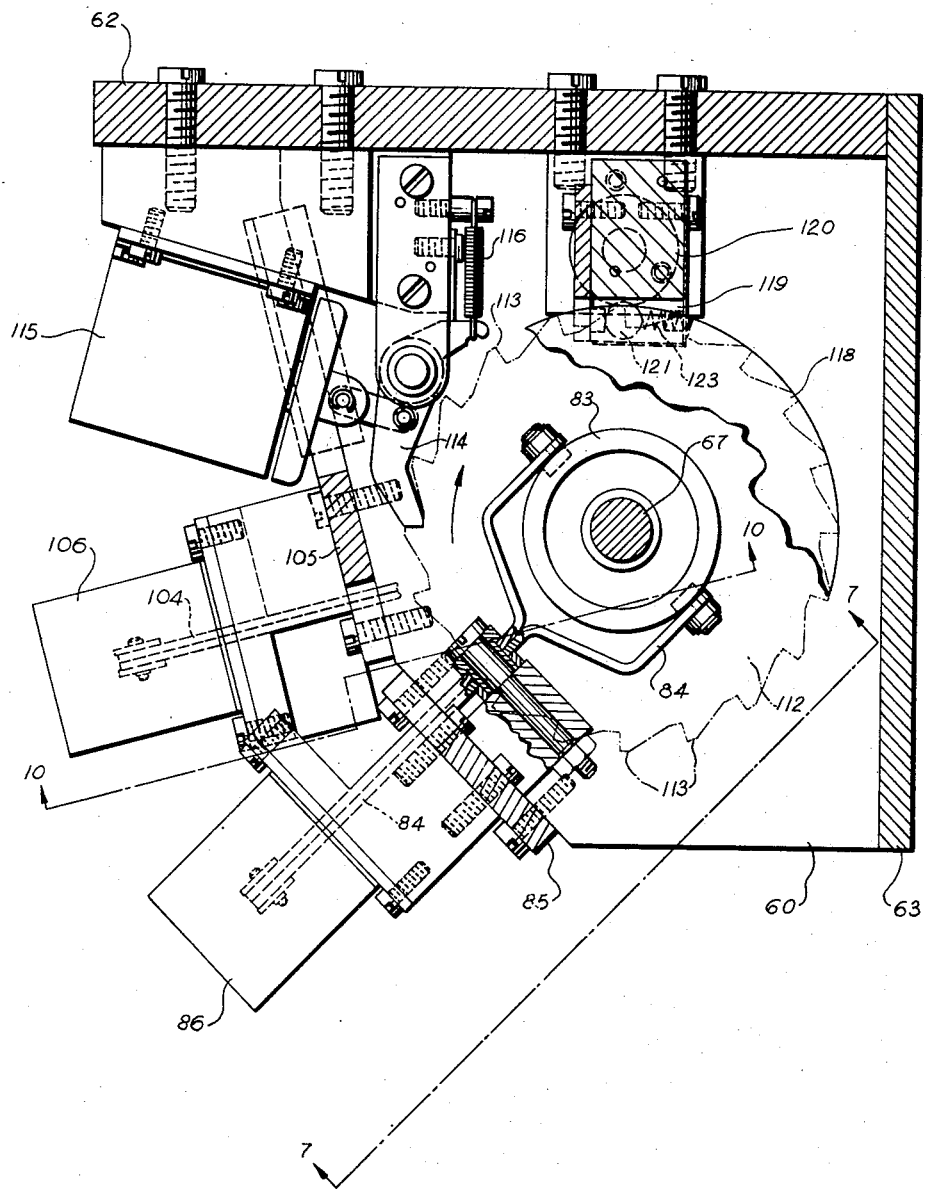
Figure 6:
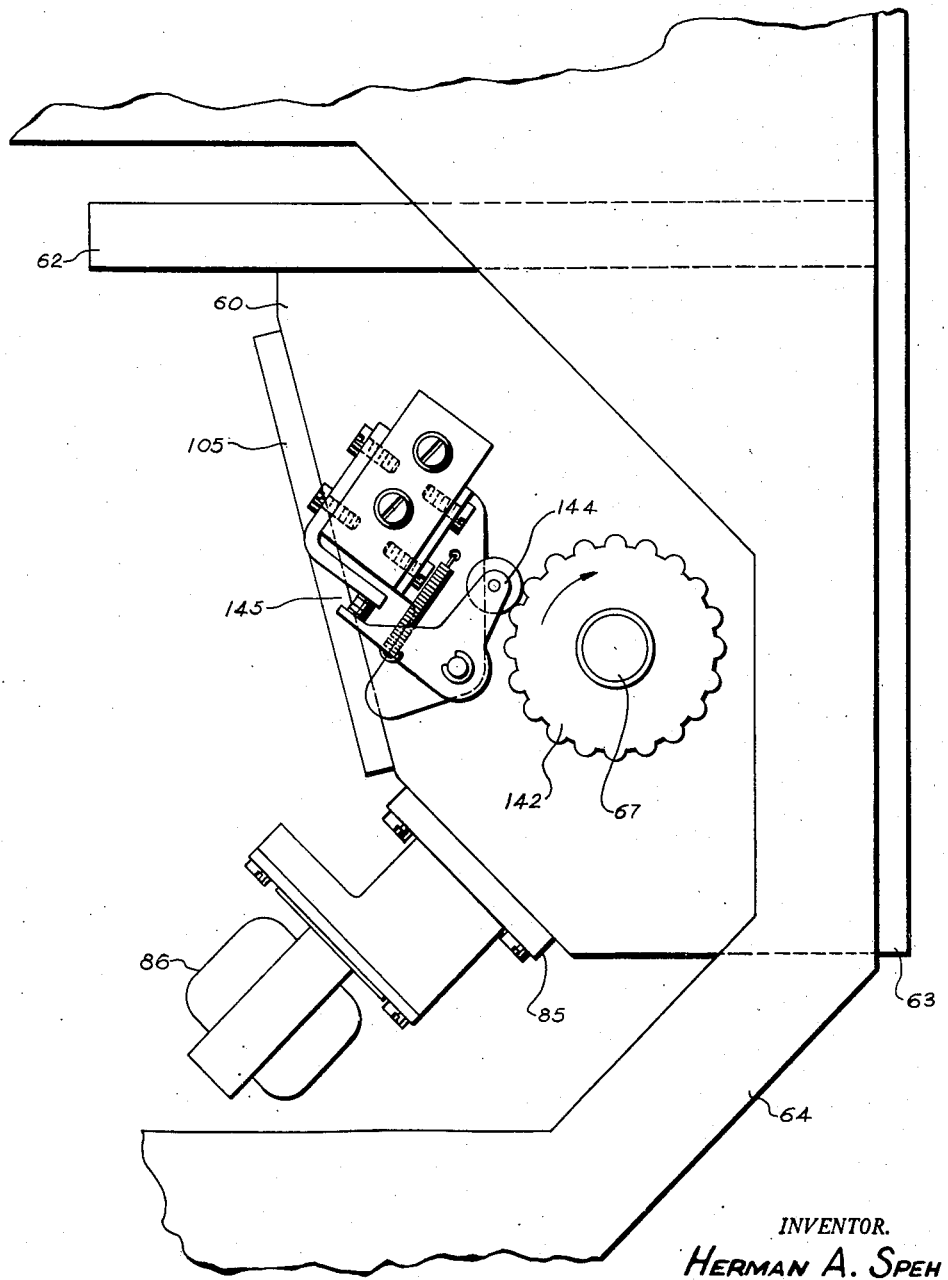
Figure 10:
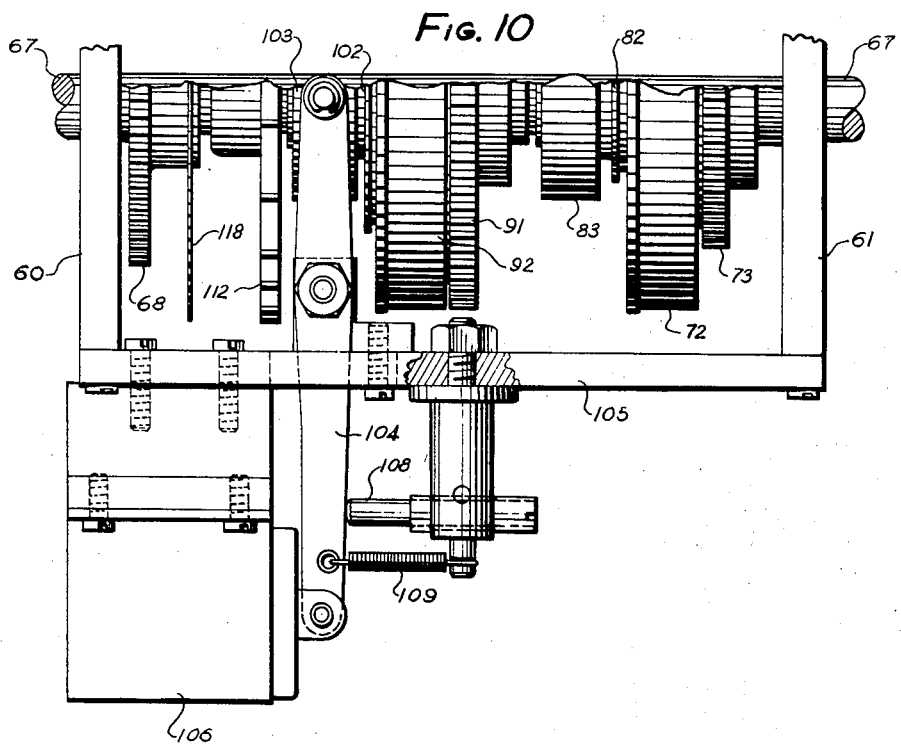
Figure 11:
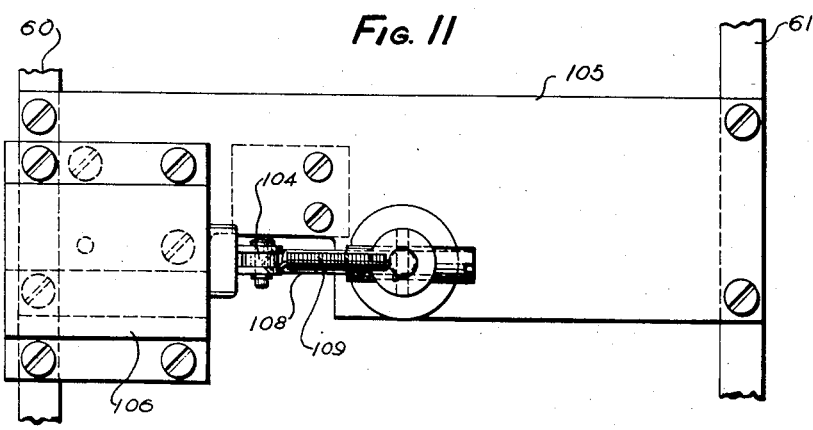
Figure 12:
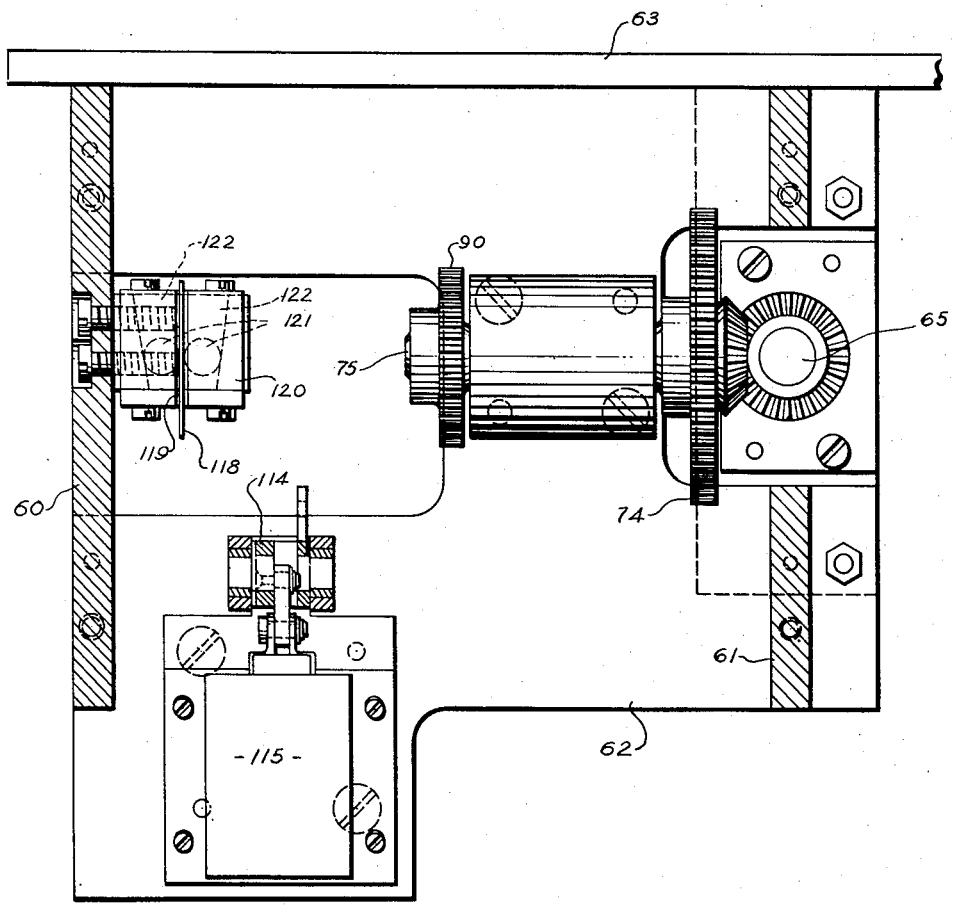
Figure 13:
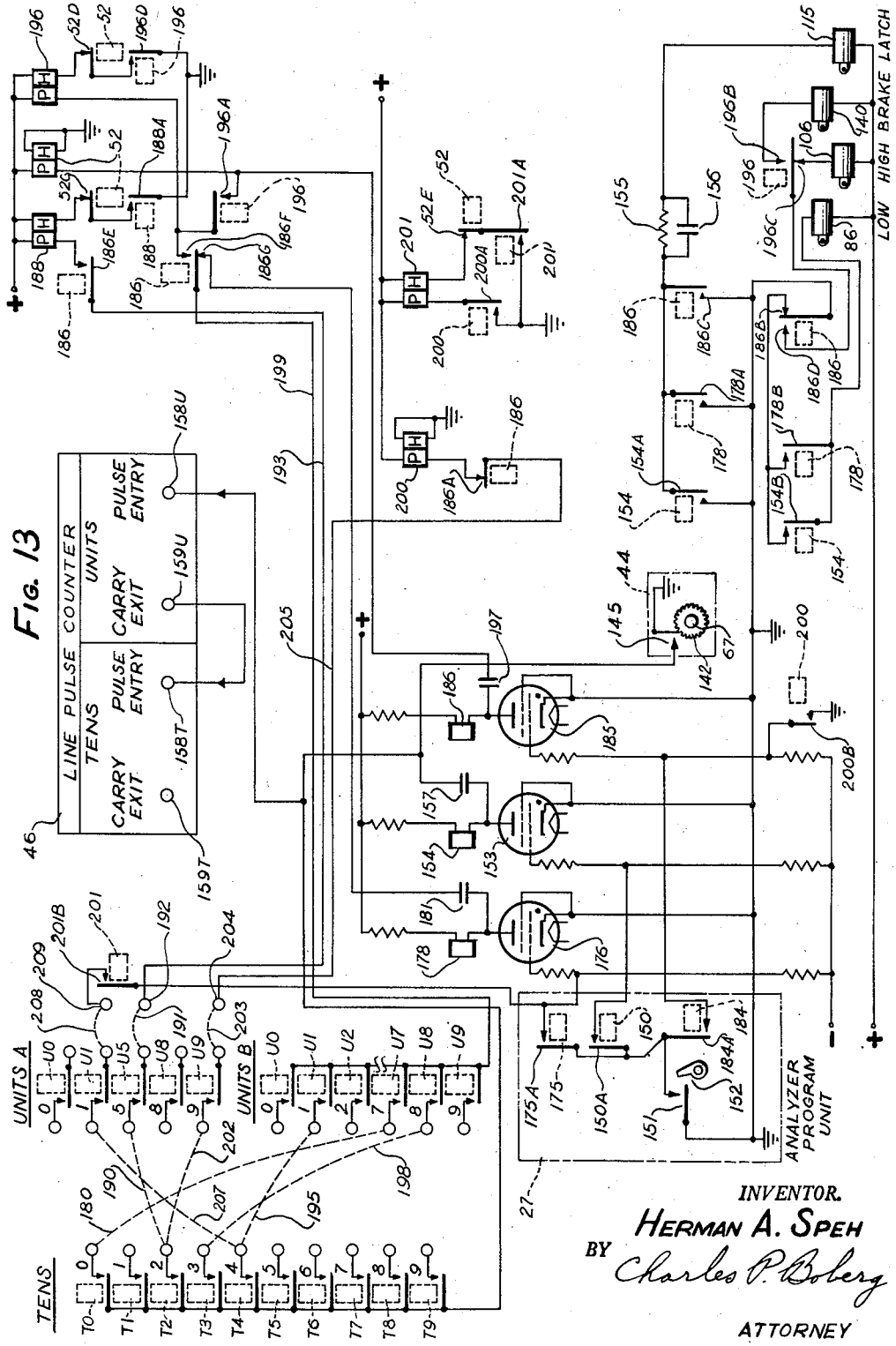
Figure 14:
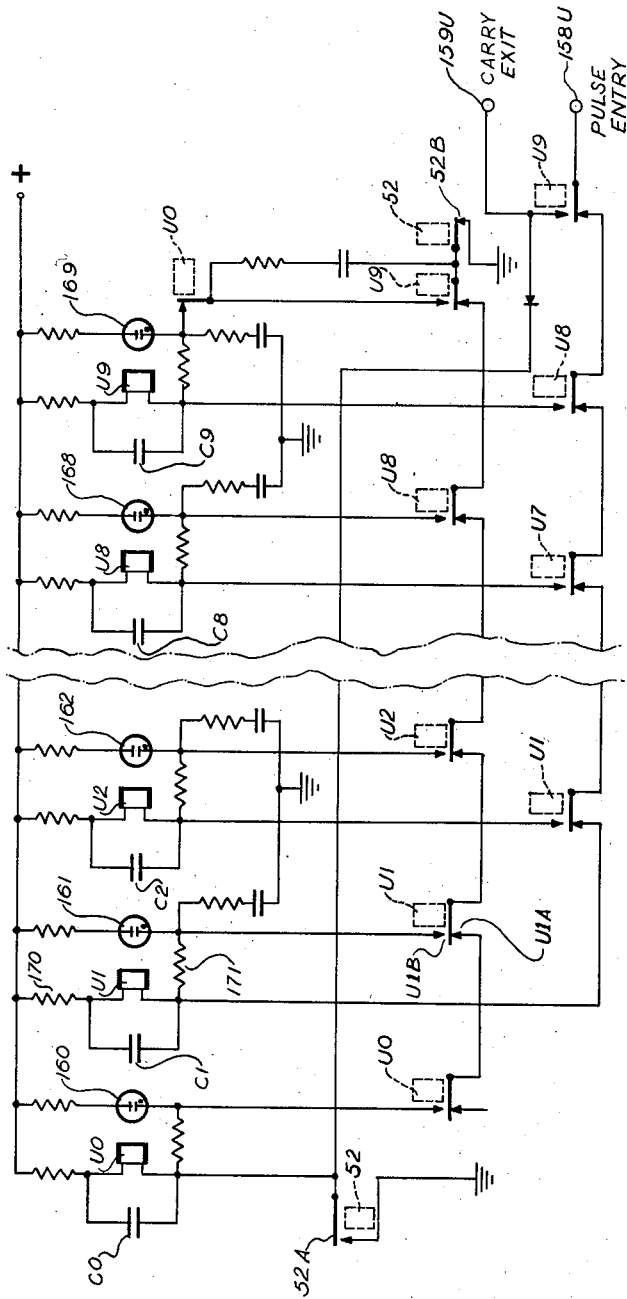

In the drawings:

Fig. 1 is a schematic representation of a card-controlled recording and sheet feeding apparatus which embodies the principle of the invention, Fig. 2 is a view on a reduced scale showing a sheet on which lines of information or data have been recorded, said lines of information being spaced from each other in accordance with the respective amounts of sheet feeding movement imparted to this sheet between the recording operations, Fig. 3 is a partial representation of a record card of the type which may be used to control the apparatus shown in Fig. 1, Fig. 4 is a plan view, partially in section, showing certain mechanisms included in the sheet feeding means proper, Fig. 5 is a sectional view of the structure shown in Fig. 4, taken on the line 5—5 therein, with some of the elements being shown fragmentarily or in phantom for greater clarity and other elements being omitted altogether, Fig. 6 is a side view of the mechanism in Fig. 4 looking from the left, Fig. 7 is a partial, sectional view taken on the line 7—7 in Fig. 5, Fig. 8 is a view looking from the bottom of Fig. 7, Fig. 9 is a chart showing the development of a ratchet as referred to the relative timing of the line pulses, Fig. 10 is a partial, sectional view taken on the line 10—10 in Fig. 5, Fig. 11 is a view looking from the bottom of Fig. 10, Fig. 12 is a sectional view taken on the line 12—12 in Fig. 4, Fig. 13 is a circuit diagram of the spacing control devices (see Fig. 1) and certain portions of the circuitry associated therewith, Fig. 14 is a fragmentary circuit diagram of the line pulse counter (see Fig. 1) and its associated reset circuit, Figs. 15 to 18 are timing diagrams of the relay and solenoid operations which are involved in various machine functions.

The embodiment of the invention herein disclosed will first be described in general terms with reference to Fig. 1 of the drawings. This view schematically represents a card controlled apparatus for feeding a sheet or web S intermittently past (or through) a recording means 20 to have lines of data or information recorded thereon. In the description which follows it will be assumed that the recording means 20 is a selective, high-speed printer which functions in each operation thereof to print a line of information upon the sheet S. The invention, of course, is not limited to this particular type of recording means.

The sheet feeding means proper, identified by the reference numeral 22 in Fig. 1, may be adapted to feed a sheet S of the particular variety shown in Fig. 2, this being a fanfold sheet which is divided throughout its length into individual forms or sections as F1, F2, F3 and so on. A sheet of this sort customarily is provided with a row of holes 24 along each lateral margin thereof to engage with the teeth of sprocket wheels or the like that are included in the sheet feeding means. The body of the sheet S may be weakened along lines such as 25 and 26, Fig. 2, to facilitate separating each individual form as F1 from the adjacent forms and from the marginal portions containing the sprocket holes 24, after the forms have been printed.

The information or data printed by the recording means 20, Fig. 1, on each of the various forms F1, F2 and so on, Fig. 2, will consist in general of a heading H containing one or more lines of printed matter and a body B containing one or more lines of printed matter. In some instances, as will be explained subsequently, the heading H may be omitted from a particular form. The data to be printed may be derived from any convenient source records such as the record cards C, Figs. 1 and 2. For present purposes (referring to Fig. 3) it may be assumed that each card C has perforated therein an identifying group number, the data to be recorded, and a special designation (X or NO X) indicating whether the card C contains information associated with the heading H or with the body B of a given form. The perforations representing the data to be recorded are not shown in Fig. 3, but it will be understood that any desired items of information which are to be recorded on a given line may be represented in this field of the card according to well known punched card practices.

All of the record cards C which pertain to a particular group or account number are arranged consecutively or in a given series, with the heading cards preceding the body cards, before the cards are fed through the machine. The mechanisms for holding the cards in stacked formation and for feeding them sequentially through the machine are not illustrated herein, inasmuch as they are well known and do not pertain directly to the invention. It will be assumed for present purposes that each heading card is identified by a perforation in the "X" index position (Fig. 3) of a particular controlling card column. This X perforation is omitted from the controlling column in each of the body cards, and this condition of the card column in question will be referred to herein as a "NO X" designation. The cards C are fed in sequence by successive groups through an upper reading station, Fig. 1, and then through a lower reading station. At the upper reading station the sensing brushes UB read the group number and the X or NO X designation in each card. At the lower reading station some of the brushes LB will sense the group number and the X or NO X designation, and other brushes LB will read the representations of the data that are to be recorded under the control of each individual card C.

As each record card C passes through the lower reading station, it causes a line of data to be printed by the recording means 20 upon the sheet S. At the same time, the group number perforated in the card at the lower reading station is compared with the group number perforated in the next succeeding card at the upper reading station, this being done by means of a group number comparison circuit 28, Fig. 1, which is contained within an analyzer program unit 27. Comparison circuits of this type are familiar to those skilled in the art, and detailed disclosure thereof is omitted herein. When a change of group number is detected, this signifies that all of the items pertaining to one group or account number have been printed upon the current form and that this form should be ejected. A new form then is moved into printing position to receive the items of data from the next group of source records (cards C).

Reference now is made to Fig. 2 which shows the arrangement of printed matter (represented by the horizontal lines generally designated H and B) upon the various forms F1, F2 and so on. The various lines of heading data, if any, are printed near the top of a form, starting at the line numbered 00. Such heading data may consist, for example, of a name and address occupying three lines. The number of lines is not material, and in some cases there may be more or fewer lines of heading data present. The various lines of the body B on each form will commence at a predetermined line position, for example, the line numbered 08.

Between the last line of the heading H and the first line of the body B it is desirable that the sheet S be moved uninterruptedly, that is, "skipped." The signal for skipping the sheet S through the space between the heading and the body of each form is furnished by an "X–NO X" comparison circuit 31, Fig. 1 included within the analyzer program unit 27, which is controlled by the respective brushes UB and LB that sense the "X" or "NO X" designations in each pair of successively fed record cards. Under normal circumstances a single line spacing movement of a sheet S takes place following the printing of each line. However, if the card at the lower reading station contains an X perforation in its controlling column (Fig. 3) while the card C at the upper reading station does not have a matching perforation, the circuit 31 then gives the signal for a skipping operation. The precise manner in which this is accomplished will be explained presently.

The foregoing description has dealt briefly with the functions of ordinary line spacing, skipping and ejecting. Insofar as the eject operation is concerned, this takes place after the last line of the body B has been printed on any given form, and it entails feeding said form to a position wherein the line numbered 42 or its equivalent (which actually is line 00 of the next form) is at the printing line. These line numbers are arbitrary, of course, and any other line numbers may be utilized in accordance with the length of each form and the spacing between lines.

Still another operation which remains to be considered is the overflow operation. Referring again to Fig. 2, it is desirable that the body B of each form should not exceed a maximum number of lines. For instance, the area between the lines numbered 08 and 30 may be reserved for the body B on each form. If the quantity of information in the body is such as to exceed this maximum number of lines on a given form (say, form F2), an overflow is called for. This means that the sheet S is first moved to bring the initial line 00 of the next succeeding form (such as F3) into printing position, but since no heading information is available at this time, the new form F3 must be advanced or skipped so as to bring its first body line 08 into printing position. Thus, an overflow operation actually comprises an eject followed immediately by a skip.

In Fig. 1 the various spacing control devices which may be utilized to effect line space, skip, eject and overflow operations are indicated respectively by the lettered rectangles 35, 36, 37 and 38. The internal construction and operation of these units will be disclosed fully hereinafter, and for the present only a general description thereof will be given. Each time one of these spacing control devices is operated or "turned on," it causes the sheet feeding means 22 to operate and feed the sheet S. For normal line spacing operations the control device 35 is turned on each time the sheet S is to be line-spaced. In the illustrated embodiment the control device 35 is turned on by the X–NO X comparison circuit 31 whenever the cards C at the upper and lower brushes UB and LB have matching X or NO X designations. The comparison circuit 31 is merely a modified form of the well known group number comparison circuit 28, and it is not considered necessary, therefore, to give a detailed description of the same herein. Moreover, insofar as the present invention is concerned, the comparison circuits 28 and 31 serve only to initiate the operations of certain spacing control devices, so that they may be regarded merely as selectively operable switches. In applications of the invention other than the one suggested in Fig. 1, other switching instrumentalities may be employed in lieu of these comparison circuits.

Operatively connected to the sheet feeding means 22 is a "source of line pulses" 44, which is adapted to emit a pulse or similar electrical signal each time the sheet feeding means 22 advances the sheet S through one line space. Between two successive lines of a heading H (Fig. 2) or two successive lines of a body B, while the sheet feeding means 22 is functioning to move the sheet S, the source 44 emits a line pulse which is effective to turn off the line space control device 35 at the end of a single line spacing movement of the sheet S.

When the last heading card of a group is being read at the lower reading station, Fig. 1, the first succeeding body card of that group will be passing through the upper reading station. Thus, while one of the reading brushes LB is sensing the X designation in the final heading card, the corresponding upper brush UB will be sensing a NO X designation (that is the absence of an X designation) in the first body card. Under these conditions the comparison circuit 31 produces a signal which turns on the skip control device 36. When the control device 36 is rendered operative, it causes the sheet feeding means 22 to function for feeding the sheet S at what might be termed a "low" speed (that is, a normal line-spacing speed) until the first body line (08) is brought into the recording position. The skipping movement of the sheet preferably is of a continuous nature rather than being intermittent.

During this skip interval, the line pulse source 44 continues to emit one pulse for each line space interval in the movement of the sheet S. These line pulses are fed in sequence to a line pulse counter 46, Fig. 1, which is merely a device for measuring the number of line positions successively occupied by the sheet S starting from a given point. The counter 46 registers one count for each line pulse, and it maintains a progressive or cumulative count until such time as it is reset under conditions which will be described subsequently. It should be explained at this point that the line count actually stands at 00 when a form is in its "line 00" position, and it moves to 01 when line 01 of the form is brought into printing position. The line counter 46 does not directly control the normal line spacing movements which take place while the heading H or body B is being printed. It is only during a long spacing operation such as skip or eject that the line counter is effective. The count maintained by the counter 46 then must be depended upon to terminate the long spacing movement at the desired point.

If the skipping movement of the sheet S is to be terminated at line 08, for example, a plugwire connection 48, Fig. 1, is established between the "off" terminal of the skip control device 36 and that exit hub of the line pulse counter 46 which corresponds to the line immediately preceding the first body line (in other words, the hub corresponding to the line 07). Then, as line 07 of the form passes the printing position, the counter 46 closes a circuit for turning off the skip control device 46 and terminating the sheet feeding operation when line 08 is reached. It will be understood, of course, that the plug connection 48 could be made to any other exit hub of the counter 46, depending upon the line of the form at which the printing of the body is to commence.

In certain portions of the description and in the claims appended hereto, reference will be made to the line pulse counter 46 as a "measuring" device. This term is employed because it will embrace other possible embodiments of the invention wherein some means in lieu of a discrete pulse counter may be employed to maintain a progressive or cumulative measure of the sheet feeding movement. Reference will be made also to "settable" means or devices whereby the so-called measuring device is able to terminate the sheet feeding movement at any desired points or stages thereof. In the present instance this "settable means" comprises the pluggable connections such as 48 and circuitry associated therewith. Here, too, this term is employed in order that known equivalents of the particular settable means illustrated herein will be included within the contemplated scope of the invention.

The operation of ejecting a form such as F1, Fig. 2, and bringing a new form such as F2 into printing position is initiated when a change of group designation is detected by the group number comparison circuit 28, Fig. 1. The eject control device 37 is turned on as the result of a group change, and it causes the sheet feeding means 22 to operate at high speed for rapidly moving a new form into printing position. The eject operation is terminated automatically when a selected line of the new form is presented to the recording means 20. In the present case it is assumed that the first heading line of the new form (F2, for example) is located exactly 42 line spaces from the first heading line of the preceding form (F1). This particular relationship will vary in practice, of course, and the illustrated line pulse counter 46 therefore has a capacity ample to accommodate the longest possible form and the greatest number of line spaces per form which may be employed. To terminate the eject operation at a particular line (say 42) a plug connection 50, Fig. 1, is established between the "off" side of the eject control device 37, and that exit hub of the line pulse counter 46 corresponding to the next preceding line (41). Hence, when 41 line positions have been counted from the beginning of the form, a circuit is closed through the connection 50 for turning off the eject control device 37 and thereby terminating the movement of the sheet S at line 42, which actually is line 00 of the next form.

When the eject control device 37 is turned off, it sends a signal to a reset device 52, Fig. 1, which is effective to reset the line pulse counter 46 to its "00" condition. Thus, the counter 46 is cleared automatically as each new form is advanced to the recording means 20.

If a reset of the line pulse counter 46 fails to occur before a certain line of any form is reached, it then becomes necessary to initiate an overflow operation. In the present example this will occur whenever the card group number designation fails to change before a particular line (such as the line 30) of a form is reached. Under these circumstances it is desired that the next form be presented to the recording means 20 in such a way that the first body line on this form will be at printing position. For instance, referring to Fig. 2, the form F3 will contain the overflow data which could not be printed on form F2. Since nothing but body data will be printed on form F3, the heading is omitted from form F3.

An overflow operation entails an eject immediately followed by a skip to the first body line of the new form. The overflow control device 38, Fig. 1, is turned on by a signal which is sent through a plug connection 54 from the exit hub on the counter 46 which corresponds to the penultimate body line (29 in this case). Through suitable interlocks (not shown in Fig. 1) the overflow control device 38 is prevented from operating if the line pulse count reaches 29 in the course of an eject operation which was initiated from a preceding line of the form. It is only when the line pulse count reaches 29 by a series of normal line spacing movements that the overflow control becomes effective.

When operated, the overflow control device 38 functions first to turn on the eject control device 37. Thereupon the sheet S is advanced at high speed to bring line 00 of the next form into printing position. Ordinarily this would be the line of the new form upon which the first heading line is printed. Since there will be no heading in this instance, the overflow control device 38 then turns on the skip control device 36 for bringing the first body line of the new form into printing position. At the conclusion of the eject operation, the reset device 52 is operated to clear the counter 46, and concurrently therewith the reset device 52 turns off the overflow control device 38. The skip control device 36, however, has in the meantime been turned on, and skipping will take place until the line pulse counter advances from 00 and 07, whereupon a circuit is closed for arresting the new form at line 08, as mentioned above.

It will be understood that normal card feeding takes place only while normal line spacing is in progress. The occurrence of a skip, eject or overflow operation will temporarily suspend the feeding of record cards in accordance with well known practice.

Attention will be given now to certain mechanical details of the sheet feeding means 22, which has been represented only schematically in Fig. 1. The particular sheet feeding mechanism which is about to be described is only one of many possible mechanisms that may be employed for carrying out the purposes of this invention. For convenience of illustration, the sprocket wheels that actually engage and move the sheet S (Fig. 2) have been omitted from the present showing, but all of the remaining details of the sheet feeding mechanism are shown in Figs. 4 to 12, inclusive.

Referring first to Fig. 4, the illustrated portions of the sheet feeding mechanism are mounted in a framework comprising the sides 60 and 61, the back 62 and a top plate 63 shown in Figs. 6 and 12. Top plate 63 and a side plate 64, Fig. 6, are included in the frame of the recording means proper, to which the sheet feeding means may be attached. The sheet feeding mechanism, Fig. 4, derives its power from the drive for the recording means through a drive shaft 65, fragmentarily shown. The power from this shaft is transmitted through suitable change speed gearing and clutch mechanisms (to be described) to an intermediate shaft 67, which is journaled in suitable bearings that are provided in the sides 60 and 61. Secured to the intermediate shaft 67 is a gear 68, Fig. 4, which transmits power from the shaft 67 to the sprocket wheels (not shown) that drive the paper sheet or form.

When the intermediate shaft 67 rotates, the gear 68 thereon moves the sheet S, Fig. 2. The shaft 67 can be driven at either a "low" speed or a "high" speed (these being relative terms) through the medium of a low speed clutch 70 or a high speed clutch 71. Low speed feeding occurs during a normal line spacing or skip operation, and high speed feeding takes place during eject. Inasmuch as the two clutches 70 and 71 have a similar construction, a detailed description will be given of one clutch only.

Considering the low speed clutch 70 in detail, the driving rim or hub 72 of this clutch is rotatably mounted upon the intermediate shaft 67. Secured to the member 72 is a gear 73 that meshes with a gear 74 fixed to a stub shaft 75. The shaft 75 is connected through bevel gearing to the drive shaft 65 and rotates in unison therewith. Hence, the driving rim 72 of the clutch 70 rotates constantly when the drive shaft 65 is rotating.

The driven member 78 of the clutch 70 carries radially movable friction shoes 79 disposed within the driving rim 72. The hub of the member 78 is secured to the shaft 67. The radially movable shoes 79 are connected by links 80 to an actuator 82 which is axially movable on the shaft 67. A collar 83 is rotatably mounted on the hub of the actuator 82, and this collar 83 is embraced by a yoke 84, Figs. 5 and 7, which is pivotally supported by a plate 85 secured to the sides 60 and 61 of the frame. Also mounted on the plate 85 is a solenoid 86, Figs. 7 and 8, which is adapted to actuate the yoke 84.

Normally the yoke 84 is held against an adjustable stop 88, Fig. 7, by a spring 89. In this position of the parts, the actuator 82 is retracted to its maximum extent from the driven clutch member 78, and the friction shoes 79 are retracted from the driving rim 72 of the clutch 70. When the solenoid 86 becomes energized (in a manner which will be explained hereinafter) the yoke 84 is swung in such a direction as to move the collar 83 and actuator 82 axially toward the driven clutch member 78. The links 80, Fig. 4, thereupon tend to straighten radially, thereby pushing the friction shoes against the driving rim 72. The clutch is now engaged, and the motion of the driving rim 72 is imparted to the driven member 78 which is secured to the shaft 67. The ratio of the gears 73 and 74, Fig. 4, is such that the shaft 67 rotates at a relatively low speed (217 R. P. M.) when the clutch 70 is engaged. As explained above, this low speed is utilized in normal line spacing and in skip operations.

The high speed clutch 71, Fig. 4, is constructed in the same fashion as the low speed clutch 70, and consequently only a brief description of it will be given. The clutch 71 has a rimmed driving member 92 which is rotatable on the shaft 67, and this member 92 is connected by gears 90 and 91 to the shaft 75. The driven member 98 of the clutch 71 carries friction shoes 99 which are adapted to be moved radially by an actuator 102 through the medium of links 100. The collar 103 of the actuator 102 has a yoke 104, Figs. 10 and 11, pivotally supported by a plate 105 which normally is held by a spring 109 against a stop 108. Energization of a solenoid 106 causes the yoke 104 to move the actuator 102 for engaging the clutch 71. When the clutch 71 is so engaged, the intermediate shaft 67 is rotated at a relatively high speed (543 R. P. M.). This high speed is desirable when a form is being ejected.

A ratchet wheel 112, Figs. 4 and 5, secured on the shaft 67 has 20 teeth 113 evenly spaced around its periphery. A pawl or latch 114, Fig. 5, is pivotally mounted in a position to engage the ratchet teeth 113 selectively under the control of a latch solenoid 115. Normally the latch 114 is urged by a spring 116 against the ratchet wheel 112, but when the solenoid 115 is energized, the latch 114 is withdrawn to permit rotation of the shaft 67. The operation of the latch 114 will be explained in greater detail hereinafter, but it may be noted at this time that the latch 114 is withdrawn whenever a clutch 70 or 71, Fig. 4, is engaged, and the latch 114 moves back into engagement with the ratchet wheel 112 approximately at the time when said clutch is disengaged. The spacing between two successive ratchet teeth 113 corresponds to a single line space on the sheet S, Fig. 2; hence the number of line spaces through which a sheet is advanced will correspond to the number of teeth 113 which pass the pawl 114 while the latter is held in its withdrawn position.

It is desirable to prevent retrograde movement of the intermediate shaft 67, and to this end a one-way brake of the ball type is provided. Referring to Figs. 4, 5 and 12, a disc 118 secured to the hub of the gear 68 extends into a slot 119 in a block 120 that is secured to the frame of the sheet feeding mechanism. The gear 68, as mentioned above, is secured to the shaft 67. Two metal balls 121 are respectively disposed in tapered slots 122, Fig. 12, within the block 120. These balls 121 are urged by springs 123, Fig. 5, toward the narrow ends of the slots 122 and into engagement with the disc 118. Rotation of the disc 118 in the desired direction tends to force the balls 121 toward the large ends of the slots 122. If the shaft 67, and consequently the disc 118, should show any tendency to rotate in a reverse direction, the balls 121 immediately will wedge themselves against the disc 118 and prevent such reverse rotation. This serves to prevent any rebound of the rotating parts when the ratchet 112 is engaged by its latch 114, Fig. 5.

To cushion the impact which otherwise tends to occur when the ratchet wheel 112 is arrested at the end of a high-speed (ejecting) operation, it is desirable to provide a friction brake working in conjunction with the high-speed clutch 71. As shown in Fig. 4, a stationary rim member 125 is secured to the side piece 61 of the frame. A rotatable member 126 secured to the intermediate shaft 67 carries brake shoes 128 which are adapted for radial movement with respect to the rim 125. The brake shoes 128 are connected by links 129 to an actuator 130 which is axially slidable on the shaft 67. A collar 132 rotatable on the actuator 130 is embraced by a yoke 133, Fig. 7, that is pivotally supported by the plate 85. A spring 135 normally urges one end of the yoke 133 against an adjustable stop 136. A brake solenoid 140, Figs. 7 and 8, is arranged to actuate the yoke 133. Normally the spring 135 urges the yoke 133 in such a direction that the brake shoes 128, Fig. 4, are retracted from engagement with the rim 125. When the solenoid 140 is energized, the yoke 133 is swung in the opposite direction to engage the brake shoes 128 with the rim 125. The brake is in a disengaged condition when the high-speed clutch 71 becomes engaged. When the clutch 71 is disengaged, the brake solenoid 140 is energized, causing the brake to be applied for reducing the momentum of the rotating parts. This occurs a predetermined time before the latch 114, Fig. 5, is released to engage the ratchet 112. The brake solenoid 140 is deenergized coincidentally with the deenergization of the latch solenoid 115.

In Fig. 1 the source of line pulses is schematically represented at 44. In the present embodiment of the invention this line pulse source 44 constitutes a circuit breaker, which is best shown in Fig. 6. A timing cam 142 having twenty evenly spaced lobes thereon is secured to a portion of the intermediate shaft 67 which extends beyond the side piece 60 (Fig. 4). A cam follower 144 cooperating with the cam 142 controls a pair of circuit breaker contacts 145. As the intermediate shaft 67 rotates during a paper feeding operation, the circuit breaker contacts 145 will be closed once for each line space. Referring to Fig. 9, the line pulses generated by the circuit breaker as it intermittently closes its contacts 145 will coincide respectively with the passage of the ratchet teeth 113 past the associated latch or pawl 114. The manner in which these line pulses are utilized to control the sheet feeding movement will be explained presently.

CIRCUIT DIAGRAMS AND OPERATION

The main circuit diagram, Fig. 13, illustrates the principal parts of the circuitry shown in Fig. 1 (to the right of the dashed rectangle 27). Fig. 14 shows the circuits for one unit to the line pulse counter represented in Fig. 13. Figs. 15 to 18 are timing diagrams which illustrate the operations of the circuits shown in Figs. 13 and 14 under various conditions that are referred to hereinafter.

As previously mentioned, the group number comparison circuit 28 and the X–NO X comparison circuit 31, Fig. 1, are included in an analyzer program unit represented by the rectangle 27, which unit is of essentially conventional construction. This unit 27 also includes various well known programming devices which determine the sequence wherein various operative functions shall be performed by the machine. For example, the program unit 27 properly times the card feeding functions in relation to the sheet feeding and recording functions. Also, depending upon the analysis of data contained in the record cards, the program unit conditions various circuits to effect line spacing, skipping, ejection and overflow operations as they are needed. Inasmuch as the present invention is not concerned with the manner in which the program unit 27 performs all of its functions, detailed description of this unit is omitted herein. It will be assumed that the program unit 27 is so constituted as to furnish the appropriate electrical signals as they are needed for initiating those operations which are about to be described.

Normal line spacing

A single line spacing operation normally is initiated after each line of information is recorded upon the sheet S. (In exceptional cases there will be a longer spacing operation, as is explained below.) Normal line spacing (single space) is accomplished in the present instance by causing a relay 150, Fig. 13, to close its contact 150A. The relay 150 is included in the analyzer program unit 27 mentioned above. As indicated in Fig. 1, normal line spacing will occur only if there has been no change in the X or NO X designation from one card to the next succeeding card. If there is a change in this X or NO X designation, normal line spacing is suspended and a skip or eject takes place in lieu thereof. The latter operations will be described very shortly.

Referring again to Fig. 13, the closure of relay contacts 150A occurs shortly prior to the closure of a timing contact 151, which is operated by a timing cam 152. When both of the contacts 150A and 151 are closed, ground potential is applied momentarily to the control grid of a gas tube or thyratron 153. Normally this control grid is maintained at a negative potential to prevent the tube 153 from firing, but when the grid potential is raised to ground level, the tube 153 is fired and remains conductive until it is extinguished again in a manner which will be described presently. When the tube 153 conducts, a relay 154 in the anode circuit thereof is operated, causing the contacts 154A and 154B to be transferred or shifted. Relay contact 154B, in closing, completes a circuit through the winding of the solenoid 86, Figs. 7 and 13, which operates the low speed clutch 70, Fig. 4. The sheet S thereupon is fed at a relatively low speed (217 R. P. M. of the intermediate shaft 67). The "line space" control device 35, shown schematically in Fig. 1, comprises the combination of the tube 153 and the relay 154 which are shown in Fig. 13.

Concurrently with the energization of the low speed clutch solenoid 86, the relay 154 closes its normally open contact 154A to complete a circuit for energizing the latch solenoid 115, which thereupon withdraws the latch 114 from engagement with the associated ratchet wheel 112 for permitting the sheet to be advanced. It will be noted that the circuit for energizing the latch solenoid 115, Fig. 13, includes a resistor 155 having a bypass capacitor 156. The capacitor 156 permits a relatively heavy surge of current to flow through the solenoid 115 at the instant when the relay contact 154A closes, thus enabling the solenoid 115 to withdraw the latch 114 very quickly. When the capacitor 155 is charged, the current through the solenoid 115 will be limited by the resistor 156 to a value which is just sufficient to hold the latch out of engagement with the ratchet.

Mention has been made hereinabove that the cam-operated circuit breaker contact 145, Figs. 6 and 13, furnishes a discrete line pulse (as indicated in Fig. 9) each time the sheet is advanced one line space. The line pulses are applied intermittently through a capacitor 157, Fig. 13, to the anode of the tube 153. If the tube 153 is previously in a conductive state, the arrival of a line pulse (ground potential) at its anode will cause the tube 153 to be extinguished. It is assumed that the relay contact 150A will have been opened by this time, so that the tube 153 cannot be fired any more until such time as relay contact 150A again is closed. As mentioned above, this will occur each time a normal line spacing is to take place. When tube 153 ceases conducting, the relay 154 is deenergized and opens its contacts 154A and 154B. The low speed clutch solenoid 86 and the latch solenoid 115 thereupon are deenergized, causing the low speed clutch 70 to become disengaged while the latch 114, Fig. 5, is restored to engage the next succeeding tooth of the ratchet 112. These operations are so timed that the sheet is accurately arrested at the end of one line space measured from its starting position.

Fig. 15 is a timing diagram which indicates the sequence of events that takes place when a sheet is advanced from line 00 to line 12, with a skip between lines 02 and 08. It is assumed that three lines of heading data will be printed in lines 00, 01 and 02, respectively. The sheet then skips to line 08, where the first line of body data is printed. For the time being, attention will be given only to the single line spacing movements. The skip operation will be described subsequently.

As was described above, the analyzer program unit 27 of the machine causes a relay 150, Fig. 13, to close its contact 150A momentarily whenever a single line space is to be effected. This causes the relay 154 to be picked up and held by the conduction of current through the gas tube 153, until such time as a line pulse from the circuit breaker 145 extinguishes the tube 153. The clutch solenoid 86 and the latch solenoid 115 are energized when relay 154 is operated and are deenergized following the release of relay 154. During this interval the sheet advances from, say, line 00 to line 01. Actually, the interval during which the sheet is in motion has been exaggerated in Fig. 15. If the drawn to scale, the period when the sheet is in motion would be slightly more than one-fourth as long as the period in which the sheet is at rest, for each printing and line spacing step in the normal course of operation.

Line pulse counter

The line pulse counter 46, Figs. 1 and 13, is responsive to the source of line pulses 44 comprising the 20-lobed cam 142 and the circuit breaker contact 145 associated therewith. As indicated in Fig. 13, the line pulse counter may have a "units" portion and a "tens" portion. This assumes a total capacity of 99 lines. If the number of lines to be counted exceeds 99, an additional "hundreds" portion may be employed. The generated line pulses are fed to the pulse entry hub 158U, Fig. 13, of the units counter. For every ten line pulses which are entered, there will be a carry pulse emitted from the carry exit hub 159U of the units counter, and this carry pulse enters the pulse entry hub 158T of the tens counter.

Fig. 14 illustrates schematically the internal construction of the units section of the line pulse counter. The tens section has a similar construction except for a slight difference which will be pointed out presently. The units counter shown in Fig. 14 has ten relays (only five of which are shown), these relays being designated respectively U0 to U9. The prefix "U" signifies "units." In the case of the tens counter the prefix "T" will be employed in referring to the individual counting relays. The ten counting relays U0 to U9 operate in succession as the line count progresses. Capacitors C0 to C9, inclusive, are bridged respectively across the coils of the relays U0 to U9 for a purpose which is about to be explained.

As the start of the count, it will be assumed that the relay U0 has been left energized as the result of a preceding reset operation (to be described). This being the case, the first line pulse to enter the pulse entry hub 158U, Fig. 14, is routed through various series-connected back contacts of the counting relays U1 to U9 to the capacitor C1 associated with the counting relay U1. This line pulse produces a brief surge of current through the capacitor C1, thereby charging this capacitor. The duration of the line pulse is too brief to cause the operation of relay U1, which has a substantial amount of inductance in its winding. Shortly after the line pulse is terminated, the capacitor C1 discharges through the coil of the relay U1 and causes the relay U1 to operate.

Referring to the timing chart, Fig. 15, it will be seen that the first line pulse causes the counting relay U1 to operate after a predetermined delay interval. It is during this delay interval that the capacitor C1, Fig. 14, is charged by the energy of the line pulse. The reason for delaying the energization of the relay U1 is to insure that the next succeeding relay (U2) is not affected by the same pulse which causes relay U1 to become energized.

As just mentioned, the counting relay U1 becomes energized when line 01 reaches printing position. By this time the first line of the heading information H (Fig. 2) will have been printed on line 00 of the form and the form now is ready to receive an imprint of the second heading line at line 01. As relay U1 energizes, Fig. 14, it opens a contact U1A, thereby interrupting the holding circuit for the relay U0 so that the latter promptly deenergizes. At the same time, relay U1 closes a contact U1B which establishes a holding circuit for the relay U1. A similar action takes place each time one of the counting relays is energized. That is to say, each counting relay, in energizing, will break the holding circuit for the preceding counting relay and establish a holding circuit for itself.

Neon lamps 160 to 169, inclusive, are associated respectively with the relays U0 to U9. Each time one of these relays is energized, its neon lamp is lighted. This merely indicates which relay is active in the group.

It is essential, of course, that the counting relay circuits be so designed that they will have the delayed action described above in responding to the various line pulses. By way of example only, the following data are given:

Relay U1—4 pole relay, 47 volts, 13 milliamperes, 3 milliseconds pickup
Capacitor C1—0.5 microfarad
Resistor 170—3,000 ohms
Resistor 171—3,000 ohms
Length of line pulse—1½ to 3 milliseconds When the line pulse count reaches "9," the counting relay U9, Fig. 14, will have been energized. Then, the next succeeding (or tenth) line pulse which enters the hub 158U will be routed to both the counting relay U0 and the carry exit 159U. Relay U0 energizes in response to this pulse and breaks the holding circuit for the relay U9. The carry pulse emitted from the hub 159U (that is, the tenth line pulse) is directed to the pulse entry hub 158T, Fig. 13, of the tens counter. The circuitry of the tens counter is similar to that of the units counter, Fig. 14. In the case of the tens counter, however, the incoming pulses are one-tenth as frequent as the incoming pulses to the units counter.

The units counting relays U0 to U9, Fig. 14, operate certain contacts having connections which are brought out to an external plugboard as indicated in Fig. 13. In the case of the units counter, two sets of relay contacts are employed, these being respectively designated "units A" and "units B." The counting relays of the tens counter, T0 to T9, operate a single set of contacts which are brought out to connections on the plugboard. Various plug connections, such as the plugwires indicated by dashed lines in Fig. 13, are established between the plughubs of the tens and units counters and between the units counter hubs and certain other plughubs in accordance with the particular sheet feeding functions which the machine is required to perform under the control of the line pulse counter. The manner of plugging the tens and units counters will be brought out more clearly hereinafter in connection with specific examples.

Occasionally it becomes necessary to reset the line pulse counter to its all-zero or clear condition. As will be seen later, this will occur as an incident to the ejection of each form after the same has been completely printed. Referring to Fig. 14, a reset device in the form of a relay 52 (briefly referred to above in connection with the description of Fig. 1) has contacts 52A and 52B which operate momentarily to reset the units counter whenever the relay 52 is energized. Relay contact 52B, in opening, will break the holding circuit of any counting relay which is in an energized state at that time. Relay contact 52A, in closing, establishes a circuit for energizing the relay U0. It is assumed that the relay contacts 52A and 52B will be so timed in their operations that contact 52B will close to establish a holding circuit for the relay U0 before relay U0 can become deenergized following the release of the relay 52. Thus, the units counter is restored to its 0 condition. A similar action takes place in the case of the tens counter during a reset.

*Skip*

Under this heading we shall consider the skipping action which takes place between the printing of the last heading line and the printing of the first body line on a form such as F1, Fig. 2. This skip operation is initiated in response to a change in the X or NO X designation which occurs between the last heading card and the first body card of any given card group or series. For instance, if all heading cards are identified by X perforations in a predetermined control column, and all body cards are distinguished by the lack of such perforations, the X–NO X comparison circuit 31, Fig. 1, will cause the skip control device 36 to be turned on whenever the card at the lower reading station contains an X designation and the card at the upper reading station contains a NO X designation.

As will be explained later, the skip control device 36 also may be caused to function as an incident to an overflow operation. This is described subsequently under the heading "Overflow."

Referring now to Fig. 13, the analyzer program unit 27 includes a relay 175 having a contact 175A which is closed momentarily each time a skip operation is to take place. During the interval when the relay contact 175A is closed, the timing cam 152 momentarily closes its contact 151, thereby applying ground potential to the control grid of a gas tube 176. This causes the tube 176 to be fired, whereupon a relay 178 in the anode circuit thereof becomes energized. As indicated in the timing diagram, Fig. 15, the signal for a skip (that is, the closure of relay contact 175A) occurs while the last heading line (02) is receiving its imprint, and the relay 178 becomes energized when the printing of this line has been accomplished. When relay 178 energizes, it closes its contacts 178A and 178B, Fig. 13. This has the effect of energizing the low speed clutch solenoid 86 and the latch solenoid 115. As the low speed clutch engages, the sheet commences to move. The motion of the sheet will continue uninterruptedly until such time as the gas tube 176 is extinguished, which in the present instance occurs just prior to the time when the line 08 reaches printing position.

The gas tube 176 and relay 178, Fig. 13, correspond to the skip control device 36 shown in Fig. 1. This control device is governed by the line pulse counter 46. If the form is to be arrested with line 08 thereof in printing position, a plug connection is established as follows: the 0 hub of the tens counter is connected by a plugwire 180 to the No. 7 entry hub of the units B group of hubs. When the line pulse counter registers 07, indicating that line 07 has reached the printing position, a circuit is established for directing the next succeeding line pulse supplied by the circuit breaker 145 through the tens 0 hub, the No. 7 units B entry hub, the relay contact 186G (now closed) and a capacitor 181 to the anode of the gas tube 176. The gas tube 176 thereupon is extinguished, causing the relay 178 to be deenergized. As the relay contacts 178A and 178B open, the low speed clutch solenoid 86 and the latch solenoid 115 are deenergized. The motion of the sheet thereupon is arrested when the next succeeding ratchet tooth is engaged by the latch 114, Fig. 5, this occurring at line 08.

To summarize the foregoing, the skipping motion of the sheet is initiated by momentarily closing the relay contact 175A, Fig. 13, in the analyzer program unit. This causes the low speed clutch to be engaged continuously for feeding the sheet without interruption until such time as the sheet reaches a position corresponding to the line following the particular line for which the counter has been plugged, by means of the plugwire 180. For example, to stop skipping at line 08, the counter is plugged for line 07. (Actually, the setting of the counter may be regarded as being equal to the number of "line spaces" intervening between line 00 and the end of skip.) At the end of this skip operation, line pulse counter 46 will have advanced to 08 in response to the same line pulse which extinguishes the gas tube 176.

During the skip operation, the analyzer program unit 27 functions to suspend the card feeding and printing operations while the skipping action is taking place. Inasmuch as these functions are not involved in the subject matter of the present invention, disclosure of the means for accomplishing the same is omitted from this description.

Eject

An eject operation usually is called for when the last body card of a group has been read and the contents thereof are printed on a form. The change of group designation which occurs at this time causes a control relay 184, Fig. 13, in the analyzer program unit 27 to close its contact 184A momentarily. While the contact 184A is closed the timing contact 151 momentarily closes and causes ground potential to be applied to the control grid of a gas tube 185, firing this tube. Conduction of current through the tube 185 causes a relay 186 in the anode circuit thereof to be energized. The gas tube 185 and the relay 186 correspond to the eject control device 37 shown in Fig. 1.

When the relay 186 is energized, it opens its contacts 186A, 186B, and 186G, Fig. 13, and closes its contacts 186C, 186D, 186E and 186F. The opening of relay contact 186B prevents any circuit from being established for energizing the low speed clutch solenoid 86. The closure of relay contacts 186D and 186C, respectively, causes the high speed clutch solenoid 106 and the latch solenoid 115 to become energized.

The analyzer program unit 27 has means (not shown) for suspending the printing and card feeding operations while an eject operation is taking place. If the eject operation has a duration of more than 16 lines (this being the time required for one complete card feeding cycle in the present machine), the card feeding automatically will be suspended for an indeterminate period, and it then is desirable that the machine should resume card feeding at a time 16 lines prior to the end of the eject time, so that the next card already is in position to be ready when the first line of the next form arrives at printing position. To this end, a special control relay 188, Fig. 13, is associated with the eject circuitry. This relay 188, as will be explained presently, is picked up at a time 16 lines before the end of the eject time. In the event there is more than a 16-line eject, the relay 188 is utilized to furnish a signal for initiating card feed. The exact manner in which the resumption of card feeding may be accomplished is not shown herein but it will be obvious to those skilled in the art.

Fig. 16 is a timing diagram for an assumed eject operation which commences right after line 24 on a form has been printed. (This refers to the 24th line position on the form, not necessarily the 24th line of printing, since some lines may remain blank.) The eject signal which occurs when relay contact 184A is closed results in the energization of relay 186, as shown in Fig. 16. The clutch solenoid 106 and latch solenoid 115 thereupon are operated, and the paper commences to move at high speed (543 R. P. M. of the shaft 67). During this period of time line pulses are generated slightly in advance of the respective lines, commencing with line 25. To pick up the relay 188 at a time 16 lines in advance of the stopping point (line 42), the line pulse counter 46 is plugged as follows: A plugwire 190, Fig. 13 is extended from the No. 2 tens counter hub to the No. 5 units A entry hub, and another plugwire 191 is extended from the No. 5 units A exit hub to a plughub 192, from which a conductor 193 leads to the normally open contact 186E of the eject relay 186. If the eject relay 186 is already energized before line 25 is reached, signifying an eject of more than 16 lines duration, the relay contact 186E will be closed at this time. Then, when the 26th line pulse is generated by the circuit breaker 145, this pulse is routed through the plugwires 190 and 191 and the relay contact 186E to the pickup winding of the relay 188. A holding circuit for the relay 188 is established through the holding coil of this relay, the contact 52C of the reset relay 52, and the normally open contact 188A of relay 188, now closed. Relay 188 thus remains energized until the reset relay 152 is pulsed at the end of eject time.

The paper is now in motion at high speed, and the remaining blank lines on the form are being counted as they pass the printing position. The relay 188 will have initiated a card feeding cycle, as just explained to bring a new card into reading position. It is assumed herein that the ejection of the form will be completed at the 42nd line, which is actually line 00 of the next form. To arrest the sheet at line 42 (that is, line 00 of the next form) the line pulse counter 46 is plugged in the following manner: A plugwire 195, Fig. 13, is extended from the No. 4 tens hub to the No. 1 units B entry hub. The counting relays T4 and U1 become energized concurrently when line 41 of the form reaches printing position. This tentatively establishes a circuit which extends through the normally open contact 186F of the eject relay 186, now closed, the normally open contact 196A of another relay 196 (which is closed at this time, as will be explained presently) and capacitor 197 to the anode of the gas tube 185. Now, when the line pulse which corresponds to line 42 is generated, said pulse is routed through the plugwire 195 and the circuit just described to the anode of tube 185, thereupon extinguishing the tube 185. Eject relay 186 thereupon is released.

In an eject operation it is desirable that the high speed clutch 71 be released a certain time before the final line is reached, and that a braking action thereafter takes place for gradually reducing the momentum of the moving parts before the latch moves back into engagement with the ratchet. In the present instance this function is accomplished by the relay 196, Fig. 13. The relay 196 is picked up at a time which is 3 lines in advance of the time when the eject control tube 185 is to be extinguished or deionized. For this purpose a plugwire 198, Fig. 13, is extended from the No. 3 tens hub of the line pulse counter to the No. 8 units B hub. The relays T3 and U8 are energized concurrently when the form reaches its line-38 position. The 39th line pulse then is routed through the plugwire 198, a conductor 199 and the relay contact 186F (now closed) to the pickup coil of the relay 196. The holding circuit for the relay 196 thereupon is established through its holding coil, the normally closed contact 52D of the reset relay 52 and the contact 196D of the relay 196, now closed.

The relay 196, in energizing, closes its contacts 196A, 196B and 196D, while opening its contact 196C. As seen in the time chart, Fig. 16, the opening of relay contact 196C causes the high speed clutch solenoid 106 to commence deenergizing, and the closure of relay contact 196B causes the brake solenoid 140 to become energized. Hence, the positive drive is removed from the sheet feeding sprockets and the moving parts are gradually braked to decelerate the sheet. The latch solenoid 115 still remains energized to keep the latch out of engagement with the ratchet.

The ejection of the form terminates when line 42 is reached (in this particular example). The 42nd line impulse causes the tube 185 to be deionized, as explained above, and the relay 186 thereupon is released. As relay contact 186C opens, the latch solenoid 115 is deenergized. The closure of relay contact 186A is without effect in this instance. The opening of relay contact 186D releases the brake solenoid 140. The high speed clutch solenoid 106 has already been released.

When the relay 196 is picked up at line 39, it closes its contact 196A without any immediate effect. That is to say, the contact 196A is so timed in its closing that the pulse which picks up relay 196 will have been terminated before 196A is closed. Later, when the 42nd line pulse is sent through the conductor 199, it passes through the now closed contact 196A and causes the reset relay 52 to be picked up at about the same time that the gas tube 185 is extinguished. Relay 52 has a holding coil which is short-circuited as shown in Fig. 13. This makes the relay 52 slow to release. As soon as relay 52 is energized, it opens its contacts 52A and 52B, Fig. 14, to reset the units counter. A similar action takes place in the tens counter. Relay 52 also opens its contacts 52C and 52D, Fig. 13, thereby breaking the holding circuits for the relays 188 and 196. As shown in Fig. 16, the relays 188 and 196 drop out when relay 52 is energized. Relay 52 automatically releases itself when line 42 is in printing position.

Fig. 17 is a timing diagram for an eject operation in which the duration of the eject is less than 16 lines. Thus, the signal for eject is assumed to occur, in this case, when line 28 of the form is printed. The eject relay 186 is energized in response to this signal and causes the sheet to be advanced at high speed to line 42. Inasmuch as the eject relay 186 had not been energized at the time when the 26th line pulse was sent through the plugwires 190 and 191 and the conductor 193 (Fig. 13), the relay 188 was prevented from energizing due to the open condition of relay contact 186E. When this relay 186E thereafter closes, it will be without effect during this particular operation, and the relay 188 therefore remains in a deenergized state. The relay 188 is not needed in this particular instance because the usual suspension of card feeding for one whole cycle, that occurs as a matter of course whenever any eject operation is initiated, is ample to permit an eject of less than 16 lines, and it is not necessary to suspend the card feed for a longer period. Hence it is not necessary to utilize a special restarting means in these circumstances.

*Overflow*

An overflow operation is called for whenever a form reaches a given line position before any eject signal is received. This condition arises whenever the number of body cards in a group is so large that two forms are required for printing all the lines of body data.

Assuming that the overflow operation is to commence after the printing of line 29 (the thirtieth line on the form), the No. 2 tens hub of the line pulse counter 46, Fig. 13, is connected by a plugwire 202 to the No. 9 units A entry hub. The No. 9 units A exit hub is connected by a plugwire 203 to a plughub 204. The 30th line pulse is generated while the counting relays T2 and U9 are concurrently energized, and this pulse is routed through the plugwires 202 and 203, a conductor 205 and the normally closed contact 186A of the eject relay 186 to the pickup coil of an overflow relay 200. As indicated in the timing diagram, Fig. 18, the relay 200 is energized at this point, and by closing its contact 200A, Fig. 13, it picks up the overflow skip relay 201. Relay 200 also closes its contact 200B, thereby grounding the control grid of the gas tube 185 and causing this tube to fire. Again referring to the timing diagram, Fig. 18, the eject relay 186 thereupon energizes and opens the pickup circuit for the overflow relay 200. The holding coil of the relay 200 is short-circuited to delay the release of this relay by a slight interval of time.

When the overflow skip relay 201 was energized, it closed its contact 201A to establish a holding circuit for itself through the normally closed contact 52E of the reset relay 52. The relay 201 also closed its contact 201B to partially condition a circuit for later energizing the skip control device at the end of the current eject. The purpose of this is to make provision for automatically skipping the next form to line 08, inasmuch as there will be no heading printed on this subsequent form.

The overflow relay 200 and the overflow skip relay 201 together constitute the overflow control device 38 represented in Fig. 1. While the overflow eject and overflow skip functions are being performed under the control of these relays, it is necessary that the printing and card feeding functions be suspended. Provisions can readily be made for this, but since these details are no concern of the present invention, they are omitted from the present description.

When the eject relay 186 becomes energized, as described above, an eject operation is initiated. This will be similar to the eject operation described above in connection with Fig. 17. Thus, the high speed clutch becomes engaged to advance the sheet rapidly and is disengaged three lines prior to what would normally be the stopping point (line 42). The brake thereupon is applied to the driven shaft. Just before line 42 is reached, the reset relay 52 is energized, but before a reset can be fully effected, the 42nd line pulse passes through a closed contact of the counting relay T4 and plugwire 207 to the No. 1 units A entry hub of the line pulse counter, thence from the No. 1 units A exit hub through a plugwire 208 to a plughub 209, from which a circuit is completed through the still closed relay contact 201B to the control grid of the gas tube 176. The tube 176 is fired while the relay 201 is being released and while the line pulse counter 46 is being reset to 0.

The firing of tube 176 causes the skip control relay 178 to become energized, as indicated in Fig. 18, just before line 42 reaches printing position. Relay 178 in turn causes the low speed clutch solenoid 86 to become engaged as the brake is released. It will be assumed that the latch solenoid 115 remains sufficiently energized during this interval to keep the latch out of engagement with the ratchet, so that the interruption in the movement of the paper will be very slight, if it exists at all. The low speed clutch solenoid 86 now is energized, and the sheet proceeds to move at the lower rate of speed just as it would in a normal skip operation.

In Fig. 18 the motion of the sheet during the overflow skip period appears to take place at the same rate as the motion of the sheet during the overflow eject. Actually, of course, this is not the true situation, due to the different clutches employed in the two instances. As shown in the diagram, Fig. 18, the overflow skip continues until the 8th line pulse is received over the plugwire 180, Fig. 13, whereupon the gas tube 176 is extinguished and the relay 178 is deenergized. This brings about the disengagement of the low speed clutch and restores the latch into engagement with the ratchet. Thus, the sheet is arrested with the next succeeding form in its line 08 position. This will be the first line to receive an impression on the new form, the heading having been skipped.

SUMMARY

From the foregoing description it is evident that by utilizing the principles of the invention, one obtains a highly flexible sheet or form feeding apparatus wherein the programs of sheet feeding movement that are performed by the apparatus, as well as the respective times at which the various movements occur or terminate, are determined at least in part by the selective plugging of a novel line counting device. In the embodiment just disclosed, for example, provisions are made for the following operations:

(1) Normal line spacing.

(2) Skipping a variable number of lines, with the end of the skip being determined by plugging the counter hubs for a selected line.

(3) Ejecting a form and bringing a selected line on the next form into printing position, as determined by the plugging of the line counter.

(4) Activating certain auxiliary devices (such as the "line minus 3" relay and the "line minus 16" relay) at selected times during the eject period, as determined by the counter plugging.

(5) Initiating an overflow eject when any selected line on a form has been printed, and effecting an overflow skip to any selected line on the next form, both of these being controlled by the plugging of the counter.

In addition to the above features, the invention provides an improved relay counter which has the advantage that it will respond to pulses of extremely short duration and which has the further advantage that it automatically delays the effect of each incoming pulse upon the counting relays until said pulse has been terminated at its source.

The term "sheet" as employed herein is intended to include any material in the nature of a sheet, paper form, web, tape or the like.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

The invention is claimed as follows:

1. In an apparatus for recording lines of data on each of a series of forms, form feeding means, line spacing means normally effective upon said form feeding means to produce a line spacing movement thereof after a line of data is recorded, measuring means including a plurality of line counting devices which are progresively operable in timed relation with the operation of said form feeding means to maintain a numerical count of the line positions successively occupied by a form during the course of the recording operations, eject control means operable to effect a form ejecting operation of said form feeding means whereby the current form is ejected and a new form is advanced to a predetermined line position, skip control means operable to effect a skipping operation of said form feeding means whereby a form is skipped to a predetermined line position without being ejected, overflow control means operable to govern the operations of said eject control means and said skip control means in an overflow operation, and selective connecting means adapted to establish operative connections selectively between said line counting devices and said overflow control means for effecting an overflow operation when a selected line count is registered by said measuring means.

2. In combination with a sheet feeding mechanism adapted to feed a sheet through a succession of line positions, a source of line pulses operable in timed relation with said sheet feeding mechanism to emit an electrical pulse each time the sheet moves from one line position to the next succeeding line position, said line pulse source being so constituted that the duration of each line pulse is limited to the time interval in which the sheet is moving between the two successive line positions, and a counter for maintaining a numerical count of the line positions successively occupied by the sheet, said counter including a chain of electromagnetic relays adapted to operate successively in response to received line pulses, each of said relays including a coil and contacts which function according to the state of energization of said coil, said contacts being adapted to establish pickup circuits in a predetermined rotation from said line pulse source to the coils of said relays as the respective line pulses are received by said counter, and pulse storage devices respectively connected in parallel with the coils of said relays for causing each of said relays to become energized a predetermined time after the corresponding line pulse is received by the counter, each of said pulse storage devices including a capacitor which is charged when a line pulse is received through the respective pickup circuit of its associated relay and which is adapted to discharge through its associated relay coil for energizing said relay after said pulse has terminated.

3. In an apparatus for recording data in separate lines on a sheet and for causing the sheet to advance through one or more line spaces after each line of data is recorded thereon, the combination of sheet feeding means, said sheet feeding means including a positive driving means and an alternatively operable braking means associated therewith, normal spacing means operable to effect normal line spacing movements of said sheet feeding means, special control means operable to initiate a long spacing movement of said sheet feeding means, measuring means including a plurality of line counting devices operable progressively in timed relation with said sheet feeding means to maintain a numerical count of the line positions succesively occupied by the sheet, additional control means effective when operated to interrupt the operation of said positive driving means and to operate said braking means, and selective connecting means for operatively connecting said additional control means selectively to any of said line counting devices in controlled relation thereto according to the line position at which said additional control means is to become effective.

4. In an apparatus for recording data in separate lines on a form or the like and for causing the form to advance through one or more line spaces after each line of data is recorded thereon, the combination of form feeding means, normal spacing means operable to effect normal line spacing movements of said form feeding means, eject control means operable to initiate a special operation of said form feeding means whereby the form is ejected, measuring means including a plurality of line counting devices operable progressively in timed relation with said form feeding means to maintain a numerical count of the line positions successively occupied by the form, indicating means controlled in part by said eject control means for giving an indication of whether or not the ejection of the form commenced before the form attained a selected line position, and selective connecting means for operatively connecting said indicating means selectively to any of said line counting devices in controlled relation thereto according to the selected line position at which said indication is desired.

5. An apparatus for feeding a sheet intermittently in selected amounts comprising a sheet feeding means, a plurality of control devices for said sheet feeding means individually operable to effect various sheet feeding movements, means normally effective to initiate the respective operations of said control devices individually under predetermined conditions, special control means operable to effect the operation of several of said control devices in sequence, a pulse source adapted to emit pulses in timed relation with the feeding of the sheet by said sheet feeding means, a pulse counter for counting the pulses emitted by said pulse source, said pulse counter including a series of outlets for said pulses which become effective in sequence as the count progresses, and selective connecting means adapted to establish operative connections selectively between said pulse outlets and said special control means to effect a predetermined sequential operation of said control devices when a selected count is registered by said pulse counter.

6. In an apparatus for recording individual lines of data upon a sheet and for causing the sheet to advance through one or more regularly spaced line positions after each line of data is recorded thereon, the combination of sheet feeding means for feeding a sheet through its successive line positions, a pulse source adapted to emit a short-duration electrical pulse indicative of a line each time the sheet is moved from one line position to the next succeeding line position by said sheet feeding means, a pulse counter including a series of electrical relay devices arranged to operate sequentially in response to the respective line pulses emitted by said pulse source, each of said relay devices being provided with a pulse delay means whereby the operation of that particular relay device is delayed until its respective line pulse has terminated and also having a control contact through which a succeeding line pulse can be passed when said relay device is in its operated state, a spacing control device operable to effect a predetermined action of said sheet feeding means, said spacing control device being adapted to operate in response to an electrical pulse of the kind emitted by said pulse source, and means for operatively connecting the control contact of any selected relay device to said spacing control device.

7. The combination recited in claim 6, wherein the last-named means comprises a plug connection between said spacing control device and the selected control contact of said pulse counter.

8. The combination recited in claim 6, wherein each of said relay devices also includes a second contact effective when its relay device has been operated in response to a given line pulse for establishing a circuit connection whereby the next succeeding relay device will be operated in response to the next succeeding line pulse.

9. In an apparatus for recording individual lines of data upon a sheet and for causing the sheet to advance through one or more regularly spaced line positions after each line of data is recorded thereon, the combination of sheet feeding means for feeding the sheet through its successive line positions, a pulse source adapted to emit a short-duration electrical pulse indicative of a line each time the sheet is moved from one line position to the next succeeding line position by said sheet feeding means, a pulse counter including a series of electrical relay devices arranged to operate sequentially in response to the respective line pulses emitted by said pulse source, each of said relay devices being provided with a pulse delay means whereby the operation of that particular relay device is delayed until its respective line pulse has terminated and also having a control contact through which a succeeding line pulse can be passed when said relay device is in its operated state, means normally effective upon said sheet feeding means to produce normal line spacing movement of said sheet between successive recording operations, other means operable to initiate a long spacing movement of said sheet feeding means, a control device operable to terminate the long spacing movement of said sheet feeding means, said control device being adapted to operate in response to an electrical pulse of the kind emitted by said pulse source, and means for operatively connecting the control contact of any selected relay device to said spacing control device.

References Cited in the file of this patent

UNITED STATES PATENTS

| | | |
|---|---|---|
| 2,606,234 | Nijman | Aug. 5, 1932 |
| 2,635,197 | Routledge et al. | Apr. 14, 1953 |